UNITED STATES PATENT OFFICE.

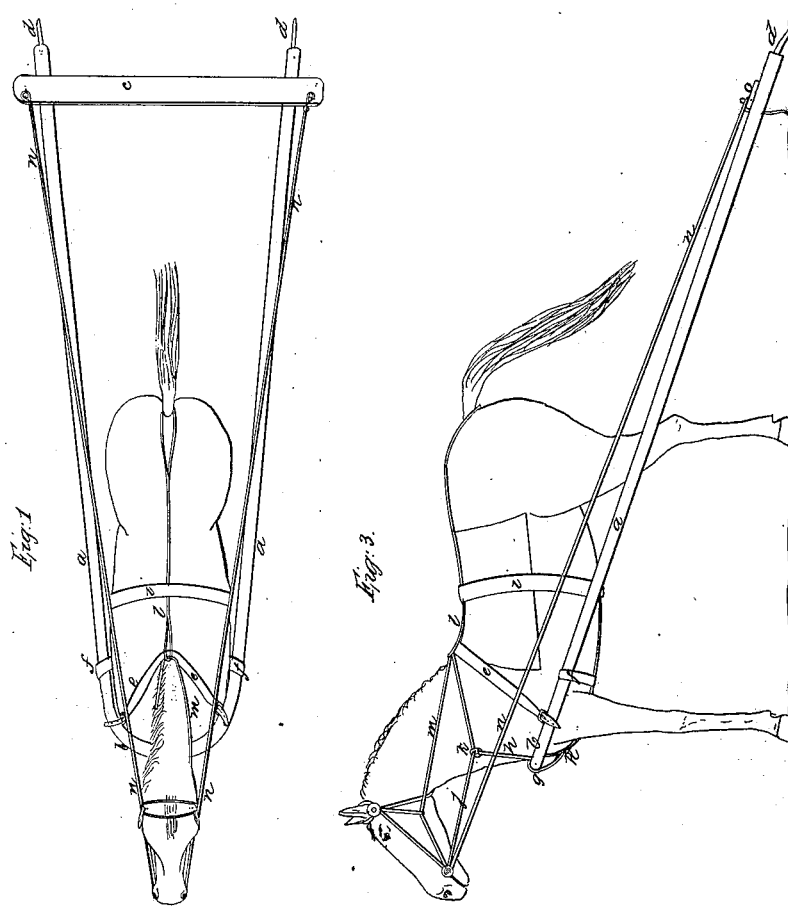
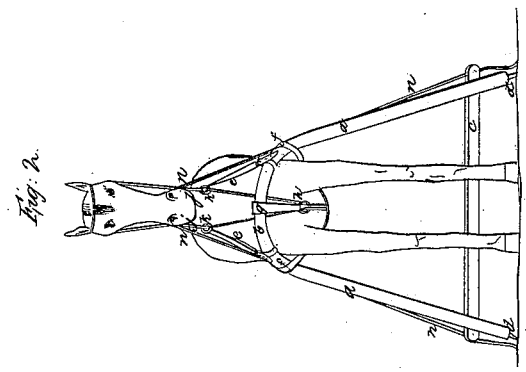

SEYMOUR TOMLINSON, OF WASHINGTON HOLLOW, NEW YORK.

APPARATUS FOR BREAKING HORSES.

Specification of Letters Patent No. 7,625, dated September 3, 1850.

*To all whom it may concern:*

Be it known that I, SEYMOUR TOMLINSON, of Washington Hollow, in the county of Dutchess and State of New York, have invented certain new and useful Improvements in the Apparatus for Breaking Horses, and that the following is a full, clear, and exact description of my improvements and of the principle or character which distinguishes them from all other things before known, reference being had to the accompanying drawings, making part of this specification, in which—

Figure 1 is a top view of a horse harnessed on my improved plan. Fig. 2, a front, and Fig. 3, a side elevation thereof.

The same letters indicate like parts in all the figures.

The nature of my invention consists in the method of breaking and controlling a horse by harnessing him to a pair of shafts connected together at their front ends by means of a bow which passes around in front of the horse's breast, the harness consisting of two straps, one passing from the bow over the horse's crest and the other from the shafts under the horse's breast and back of the front legs.

In the accompanying drawings (a a) represent a pair of what may be called shafts united together at their front ends by a bow (b) which passes around in front of the horse's breast. The two shafts and bow I usually make of one piece of timber bent around. The two shafts spread out to give ample room for the horse's hind legs, and near their rear ends they are braced together by means of a cross piece (c) and the rear end of each is provided with a metal point (d) which, when the horse attempts to back, enter the ground to resist him. The bow (b) which passes around the breast of the horse should be properly padded to prevent chafing. The horse is harnessed to a said shaft by means of a strap (e) which passes from one side of the bow (b) over the horse's crest to the other side of the bow, the said strap being provided with the necessary and usual means for connecting it with the said bow, and for adjusting its length, and where it passes over the horse's crest it may be padded to prevent chafing. Back of the before described strap (e) there is another strap (f) which passes from one of the shafts to the other, and under the horse's breast back of the front legs, the said strap (f) being also provided with the usual means for connecting it with the shafts and to adjust it to horses of various sizes. The central part of the bow is connected by a strap (g) with the martingale (h) that runs back and is secured to the belly band or girth (i). The reins (j, j,) from the bit pass through the rings (k, k,) of the martingale and thence through a loop in a crupper strap (l) and the check rein (m) is secured to the crupper strap. To each side of the bit is secured a rein or line (n,) by means of which, two men, one on each side, can with facility control the horse while standing at a sufficient distance to be perfectly safe.

From the foregoing it will be seen that from the form and construction of the shafts and the manner in which the horse is harnessed to them, that he cannot back, because the points (d, d,) enter the ground and stop him. He cannot rear up so as to fall backward for the ends of the shafts become the fulcrum on which alone he can rise; as he cannot rise, (except for the freedom of action) on his hind legs without first breaking the shafts or the straps by which he is harnessed to them. He cannot throw up his hind legs for to do this he must lift up the shafts (by reason of the connection of the strap g with the bow of the shafts) which from their weight and length render the leverage of such weight too great. The neck is completely under the control of the various reins, and by means of the two lines (n, n,) two men can control the most refractory horse and this, too, without any possibility of injury either to themselves or to the horse.

When it is desired to accustom the horse to the saddle, foot pieces may be adapted to the shafts to answer the purpose of stirrups for the rider.

What I claim as my invention and desire to secure by Letters Patent is—

The method, substantially as herein described, of breaking horses by means of the shafts which are connected together by a bow passing around in front of the horse's breast, substantially as herein described in combination with the two straps, one passing over the crest and the other under the breast, by which the horse is harnessed to the said shafts, substantially as described.

SEYMOUR TOMLINSON.

In presence of—
ALEX. PORTER BROWNE,
C. A. WM. BROWNE.